Aug. 17, 1965   R. N. DOBSON ETAL   3,200,771
RAILWAY TRUCK HAVING SPRING MOUNTED BOLSTER
Filed Dec. 26, 1961   2 Sheets-Sheet 1

INVENTORS
RICHARD N. DOBSON
HOWARD J. BEXON
BY: Fetherstonhaugh & Co
ATTORNEYS

INVENTORS
RICHARD N. DOBSON
HOWARD J. BEXON
BY: Fetherstonhaugh & Co.
ATTORNEYS

United States Patent Office 3,200,771
Patented Aug. 17, 1965

3,200,771
RAILWAY TRUCK HAVING SPRING
MOUNTED BOLSTER
Richard N. Dobson, Burlington, Ontario, and Howard J. Bexon, Oakville, Ontario, Canada, assignors to Dominion Foundries and Steel Limited, Hamilton, Ontario, Canada
Filed Dec. 26, 1961, Ser. No. 161,839
3 Claims. (Cl. 105—197)

This invention relates to railway truck frames, and in particular to railway motor carrying truck frames and associated bolster structures as primarily used in light weight electrified passenger carrying equipment.

The object of the invention is to provide a strong truck frame of simple light weight construction in which the bolster springs are so positioned in relation to the side members of the frame that the assembly is capable of maintaining uniform riding qualities and control of lateral movements throughout the loading range of a supported vehicle.

The foregoing objective, and additional objectives as hereinafter appear are achieved by the provision of an inside pedestal truck frame and bolster assembly wherein the truck has a rigid frame spring supported from its axles, the bolster being mounted transversely of the central portion of the truck for movement in respect thereto and protruding through gaps in the upper portions of the side members of the frame to rest upon pneumatic springs seated upon the bottom portions of the gaps and so positioned that the axes of the springs are considerably further from the center axis of the frame than are the center axes of the side members to give greatest resistance to roll.

Figure 1:
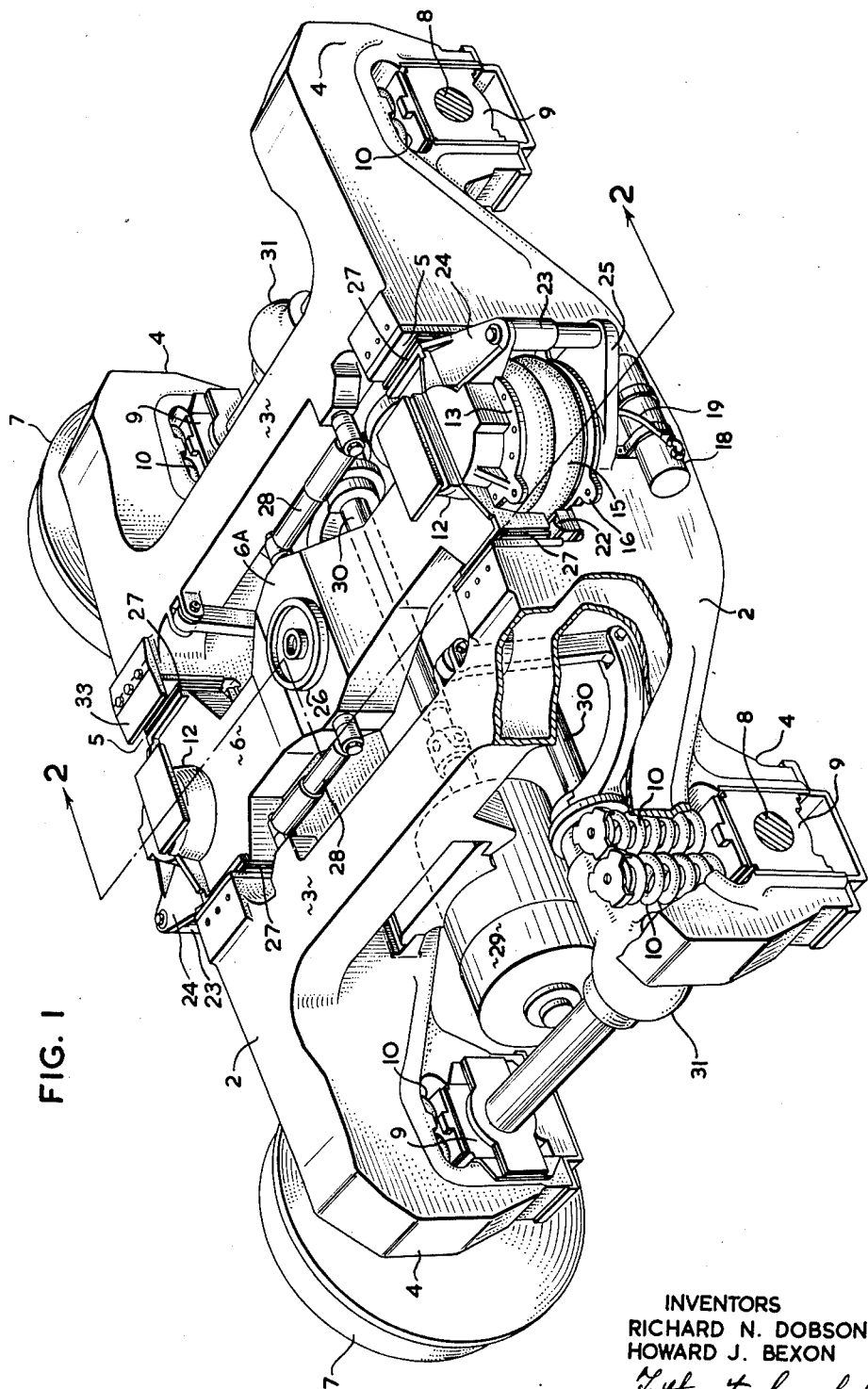

With the foregoing and other objects in view the invention consists of a railway truck suspension system constructed and arranged all as hereinafter more particularly described and illustrated in the accompanying drawings, in which:

FIG. 1 is a perspective view of the truck, springs and bolster assembly, and

Figure 2:
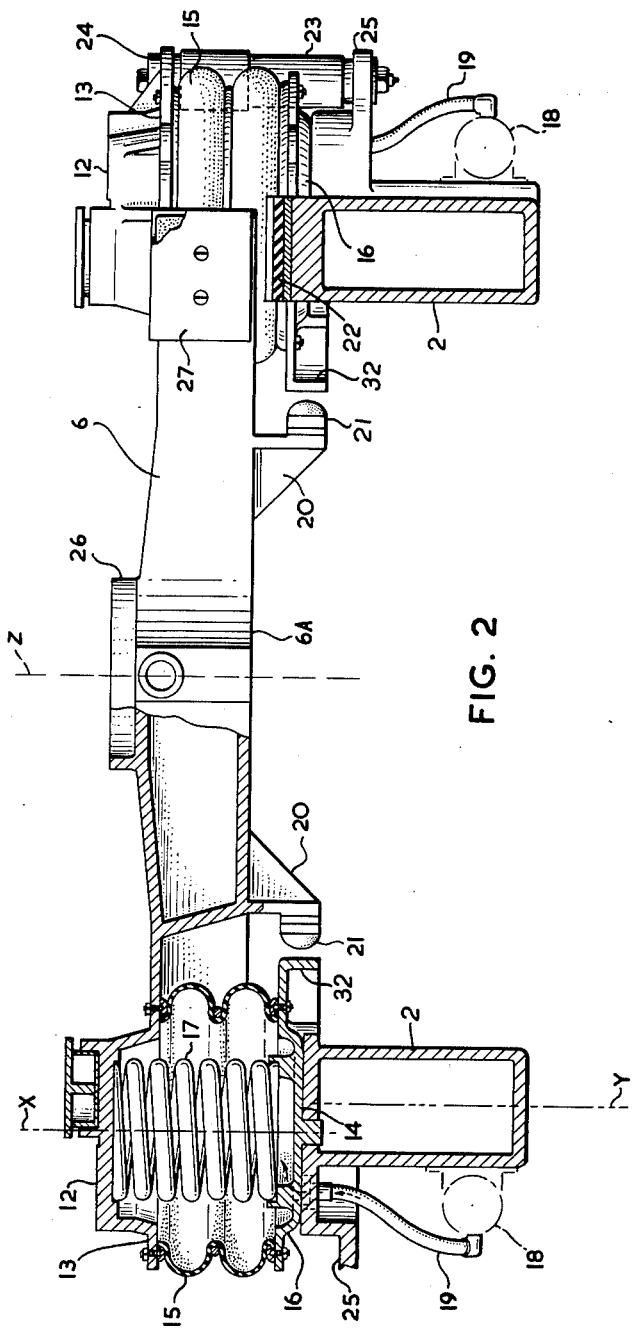

FIG. 2 a transverse vertical sectional view taken through the line 2—2, FIG. 1.

The truck frame is a rigid unitary structure, preferably a steel casting of box sections with their walls merging, and comprises two side members 2 between which a pair of transoms 3 extend and which each have two pedestal legs 4 depending from their ends, the upper central portions of the top faces of the side members being formed with indented gaps 5 for reception of the end portions of a transverse bolster 6 extending therethrough.

Truck wheels 7 are mounted upon the outer ends of axles 8 carried within journal boxes 9, the journal boxes being positioned inboard of the wheels and each being slidably received within the respective pedestal leg 4 to rest against the lower ends of a pair of coil compression springs 10 contained within the leg.

The bolster 6 is of sufficient length to protrude beyond the outer faces of the truck side members 2, and comprises a central portion 6A of box section formed with a pair of integral circular cap members 12 upon its ends, each cap member 12 constituting an upper end closure member for a corresponding pneumatic spring. Thus, each cap member has a peripheral rim portion 13 resting upon and attached to the upper end of a two-convolution flexible wall 15 of rubber-like material, the lower end of the wall 15 resting upon and being attached to a circular base plate 16 secured in place upon the lower horizontal face 14 of the corresponding gap 5, the base plate 16 constituting the lower end closure member of the corresponding pneumatic spring. Coil springs 17, concentrically positioned within the pneumatic springs, are seated upon the base plates 16 and bear against the under faces of the caps 12 to carry some of the vertical load and in addition to provide increasing lateral resistance upon increase of displacement. Compressed air pressure within the pneumatic springs is controlled by automatic levelling air valves 18 connected to a compressed air reservoir and also conected to the pneumatic springs through hose connections 19, the valves maintaining a predetermined air pressure in the pneumatic springs in relation to the load carried by the bolster, thereby constantly maintaining a carriage supported by the bolster at a substantially constant station platform height under varying passenger loads.

Upon reference to FIG. 2 it will be clearly seen that the combination pneumatic springs and contained coil springs are directly supported by the bottom portions of the gaps 5 in the side frames 2 of the truck, their axes X being within the transverse width of their respective side frames but being disposed considerably further from the center axis Z of the truck bolster than are the center lines Y of the transverse widths of the side frames.

This particular arrangement provides great resistance to roll and thus allows a lower inflation pressure of the pneumatic springs to be used for a softer vertical ride. Also, by keeping the axes X of the springs within the confines of the widths of the side frames 2 the body load is supported directly by the frames, which would not be the case if the bolster spring supporting elements were located completely outboard of the truck frames.

To provide increasing lateral resistance upon increase of displacement the ends of the center portion 6A of the bolster are formed with depending lugs 20 carrying rubber bumpers 21 which limit lateral movement of the bolster in engaging the inner side extensions 32 of the base plates 16. Similar bumpers 22 (FIG. 1) are furnished to limit vertical bolster motion. When not under load the bolster is prevented from extending more than a desired amount above the top of the truck side frames by stops such as 33 (FIG. 1). For normal control of bolster movement under the urge of its springs, shock absorbers 23 are provided to extend between extension lugs 24 on the caps 12 and brackets 25 protruding from the outer faces of truck side members 2 substantially in alignment with the bottoms of the gaps 5, the portions of the base plates 16 which project beyond the side frames resting upon the brackets 25.

The bolster is provided with the usual load carrying center plate 26, cushion or liner devices 27 being positioned between the sides of the bolster and the sides of the gaps 5. Lateral movement of the bolster due to lateral flexing of the bolster springs is controlled by snubbers 28 laterally extending between the central portions of the side walls of the bolster and the sides of the transoms 3.

Each transom 3 carries a motor 29 suspended therefrom and operatively connected to the more remote axle through a drive shaft 30 with suitable universal joint connections, and through a reduction gear box 31.

From the foregoing description it will be apparent that the entire structure is strong, compact and of light weight, and it is to be understood that while a preferred embodiment of the invention has been shown and described, that the several components of the structure may be varied substantially without departing from the spirit of the invention and the exclusive use of any of such modifications as come within the scope of the appended claims.

What we claim as our invention is:

1. In a railway truck a rigid truck frame having a truck frame central vertical axis and comprising two spaced substantially parallel side frame members each having a respective side frame central vertical axis, and each formed at least approximately centrally of its length with a respective open-topped gap having generally vertical side faces and a horizontal bottom face with the bottom face located intermediately of the depth of the corresponding side member, a journal box mounted at each end of each side frame member for vertical movement relative thereto, resilient means interposed between each journal box and the respective frame end for resiliently controlling the movement of the journal box in the frame, two axles each rotatably mounted in a corresponding pair of journal boxes at corresponding side frame ends, two pairs of road wheels with each pair mounted on a respective axle, a transverse load supporting bolster having its ends disposed in their respective side frame gaps and guided for vertical movement by the said vertical side faces, and a pair of combination springs each interposed between a respective end of the bolster and the bottom surface of the corresponding side frame gap to resiliently support the bolster in its vertical movement, each combination spring comprising a coiled spring acting along a respective vertical axis and surrounded by a respective tubular pneumatic spring acting along the same vertical axis, each said combination spring vertical axis being within the transverse width of the corresponding gap bottom surface and further from the said truck frame central axis than is the respective side frame central axis.

2. A railway truck as defined in claim 1, wherein brackets protrude from the outside faces of the truck side members, the brackets having flat upper faces in alignment with the flat bottom faces of the gaps and which support the portions of the combination coiled and pneumatic springs protruding beyond the outside faces of the truck side members.

3. In a railway truck a rigid truck frame having a truck frame central vertical axis, the frame comprising two spaced substantially parallel side frame members each having a respective side frame central vertical axis, and two spaced substantially parallel transom members extending transversely between the side frame members and joined at their ends thereto, each side frame member being formed at its central portion between its junctions with the said transom members with a respective open-topped gap having generally vertical side faces and a horizontal bottom face located intermediately of the depth of the corresponding side member, the railway truck also comprising a journal box mounted at each end of each side frame member for vertical movement relative thereto, resilient means interposed between each journal box and the respective frame end for resiliently controlling the movement of the journal box in the frame, two axles each rotatably mounted in a corresponding pair of journal boxes at corresponding side frame ends, two pairs of road wheels with each pair mounted on a respective axle, a transverse load supporting bolster having its ends disposed in their respective side frame gaps and guided for vertical movement by the said vertical side faces, and a pair of combination springs each interposed between a respective end of the bolster and the bottom surface of the corresponding side frame gap to resiliently support the bolster in its vertical movement, each combination spring comprising a coiled spring acting along a respective vertical axis and surrounded by a respective tubular pneumatic spring acting along the same vertical axis, each said combination spring vertical axis being within the transverse width of the corresponding gap bottom surface and farther from the said truck frame central axis than is the respective side frame central axis.

References Cited by the Examiner
UNITED STATES PATENTS

| | | | |
|---|---|---|---|
| 2,908,230 | 10/59 | Dean | 105—182 |
| 3,022,748 | 2/62 | Lich | 105—192 |
| 3,038,416 | 6/62 | Janeway | 105—193 |

EUGENE G. BOTZ, *Primary Examiner.*

JAMES S. SHANK, LEO QUACKENBUSH, *Examiners.*